US005727802A

United States Patent [19]

Garven, Jr. et al.

[11] Patent Number: 5,727,802

[45] Date of Patent: Mar. 17, 1998

[54] SUSPENSION WHEELCHAIR AND WHEELCHAIR FRAME

[75] Inventors: Douglas M. Garven, Jr.; Kevan L. Chu, both of Santa Cruz, Calif.

[73] Assignee: Everest & Jennings International Ltd., Earth City, Mo.

[21] Appl. No.: 711,313

[22] Filed: Sep. 3, 1996

Related U.S. Application Data

[63] Continuation of Ser. No. 570,195, Dec. 11, 1995, abandoned, which is a continuation of Ser. No. 274,826, Jul. 14, 1994, abandoned.

[51] Int. Cl.[6] .................................................. B62B 7/10

[52] U.S. Cl. .................................. 280/250.1; 280/304.1; 280/283; 280/642

[58] Field of Search ............................ 280/250.1, 304.1, 280/275, 283, 660, 647, 688, 642, 650; 180/907; 297/DIG. 4

[56] References Cited

U.S. PATENT DOCUMENTS

| | | | |
|---|---|---|---|
| 521,463 | 6/1894 | Smith-Fraser . | |
| 1,246,721 | 11/1917 | Crawford . | |
| 1,739,260 | 12/1929 | Roe . | |
| 2,347,754 | 5/1944 | Shay | 155/22 |
| 2,365,003 | 12/1944 | Reinholz | 155/11 |
| 2,448,992 | 9/1948 | Love et al. | 180/907 |
| 2,476,769 | 7/1949 | Rideout | 155/30 |
| 2,482,827 | 9/1949 | Black | 155/11 |
| 3,223,431 | 12/1965 | Gottfried et al. | 280/47.38 |
| 3,917,312 | 11/1975 | Rodaway | 280/242 WC |
| 3,976,152 | 8/1976 | Bell | 280/250.1 |
| 4,078,817 | 3/1978 | Ferguson et al. | 280/242 WC |
| 4,190,263 | 2/1980 | Powers | 280/242 WC |
| 4,310,167 | 1/1982 | McLaurin | 280/5.28 |
| 4,455,031 | 6/1984 | Hosaka | 280/242 WC |
| 4,572,533 | 2/1986 | Ellis et al. | 280/242 WC |
| 4,641,848 | 2/1987 | Ayers | 280/242 WC |
| 4,861,056 | 8/1989 | Duffy, Jr. et al. | 280/250.1 |
| 5,004,259 | 4/1991 | Ayers et al. | 280/304.1 |
| 5,064,211 | 11/1991 | Huttenhuis et al. | 280/250.1 |
| 5,076,390 | 12/1991 | Haskins | 280/250.1 |
| 5,261,684 | 11/1993 | Soto | 280/250.1 |
| 5,267,745 | 12/1993 | Robertson et al. | 280/250.1 |
| 5,409,247 | 4/1995 | Robertson et al. | 280/250.1 |
| 5,590,893 | 1/1997 | Robinson et al. | 280/250.1 |
| 5,593,173 | 1/1997 | Williamson | 280/250.1 X |

FOREIGN PATENT DOCUMENTS

| | | | |
|---|---|---|---|
| 8701561 | 2/1989 | Netherlands | 280/250.1 |
| 1505544 | 9/1989 | U.S.S.R. . | |
| 2 205 284 | 12/1988 | United Kingdom . | |

OTHER PUBLICATIONS

"CD Your Wheelchair?, Damp It, or Dump It!," CD Cellasto® Damper, Spronken Orthopedie N. V., Genk, Belgium.

"Shock Absorbers for Wheelchairs," News & Notes, Mechanical Engineering, pp. 37–38, Mar. 1994.

"California Cruzer" (product brochure).

*Primary Examiner*—Brian L. Johnson
*Assistant Examiner*—Gary Savitt
*Attorney, Agent, or Firm*—Bauer & Schaffer

[57] ABSTRACT

A wheelchair frame includes a pair of side frame assemblies, a connector connecting the two side frame assemblies, a seat, caster wheel mountings, drive wheel mountings, and a leg rest mounting. Each of the side frame assemblies have an upper frame member and a lower frame member. The upper frame member is pivotally connected at its forward end to the forward portion of the lower frame member and supported at its rearward end by a suspension support member (i.e., shock absorber) connected to the rearward end of the lower frame member. The seat is attached between the upper frame members of each side frame assembly. With this configuration, the upper frame members and the seat are free to pivot about the pivotal connection between the upper frame member and the lower frame member. In operation, the upper frame members and seat "float" up and down on the shock absorber to provide cushioning to the user. With this novel configuration, the drive wheels, caster wheels and the lower frame members remain relatively rigid and therefore maintain stability, wheel alignment and maneuverability of the wheelchair. The invention also includes a foldable embodiment of the suspension wheelchair.

20 Claims, 7 Drawing Sheets

SUSPENSION WHEELCHAIR AND WHEELCHAIR FRAME

This application is a continuation of application Ser. No. 08/570,195 filed Dec. 11, 1995 which is a continuation of application Ser. No. 08/274,826, filed Jul. 14, 1994 both now abandoned.

FIELD OF THE INVENTION

The present invention relates to wheelchairs and particularly to wheelchair frames having suspension systems.

BACKGROUND OF THE INVENTION

A wheelchair user is continually exposed to considerable vibrations and impact forces from the wheelchair rolling over irregular surfaces, going up or down steps and curbs, and rolling over other obstacles. In the past, various devices have been proposed for minimizing the forces that are transmitted through the chair to the user. These devices focus on attaching the main drive wheels to a pivot arm and a shock absorbing device to absorb vibration and impact forces through movement of the drive wheels and pivot arm.

One such device consists of modifying an existing wheelchair with the addition of an apparatus that attaches to the axle of the drive wheels. For example, U.S. Pat. No. 4,572,533 (Ellis et at.), U.S. Pat. No. 4,190,263 (Powers) and U.S. Pat. No. 4,078,817 (Ferguson et at.) each disclose an apparatus which can be mounted on a conventional wheelchair. Each drive wheel of the wheelchair is removed and attached to the apparatus so that the main frame members of the wheelchair remain rigid. When an irregularity in the road surface is encountered, the drive wheel and the apparatus move substantially in a vertical direction to absorb the shock.

Another design consists of incorporating shock absorbing devices into the initial design of the wheelchair. For example, U.S. Pat. No. 4,861,056 (Duffy, Jr. et at.) discloses a folding wheelchair having a suspension system comprising a pair of suspension wings pivotally mounted to the wheelchair frame by a pivot block. Each drive wheel axle is rotatably attached to the rearward end of the suspension wing. The forward end of the suspension wing engages a spring or shock absorber which, in turn, attaches to the wheelchair frame. As uneven terrain is encountered, the suspension wing and thus the drive wheel pivots on the pivot block to reduce the shock transmitted to the occupant.

U.S. Pat. No. 4,455,031 (Hosaka) discloses a wheelchair having a rear suspension support frame having its front end pivotally connected to the wheelchair frame and the main drive wheels attached at the rear end to opposite sides of the rear suspension support frame. A shock absorber is connected between the main wheelchair frame and the rear suspension support frame.

U.S. Pat. No. 3,917,312 (Rodaway) discloses a C-shaped frame having left and right caster wheels being mounted to the left and right free ends of the lower arms of the C-shaped frames so that the upper arms are cantilevered from the rear drive wheels. As a consequence of the C-shaped configuration of the frames, the caster wheels are independently resiliently supported for up and down movement relative to the seat.

In view of the prior art, there is a continuing long-felt need in the art of wheelchair design to provide comfort to the user while improving the stability and maneuverability of the wheelchair in a simple, light-weight, cost-effective design.

SUMMARY OF THE INVENTION

The present invention provides a suspension wheelchair, and in particular a wheelchair frame, that provides desirable characteristics in a suspension wheelchair, while overcoming the disadvantages of the prior art devices.

A wheelchair frame in accordance with this invention includes a pair of side frame assemblies, a connector connecting the two side frame assemblies, a seat, caster wheel mountings, drive wheel mountings, and a leg rest mounting. Each of the side frame assemblies have an upper frame member and a lower frame member. The upper frame member is pivotally connected at its forward end to the forward portion of the lower frame member and supported at its rearward end by a suspension support member (i.e., shock absorber) connected to the rearward end of the lower frame member. The seat is attached between the upper frame members of each side frame assembly. With this configuration, the upper frame members and the seat are free to pivot about the pivotal connection between the upper frame member and the lower frame member. In operation, the upper frame members and seat "float" up and down on the shock absorber to provide cushioning to the user. With this novel configuration, the drive wheels, caster wheels and the lower frame members remain rigid and true and therefore enabling the wheelchair to maintain its full stability, wheel alignment and maneuverability while absorbing shocks.

In accordance with one aspect of the present invention, a wheelchair frame is provided comprising a pair of side frame assemblies, each of said side frame assemblies comprising an upper frame member and a lower frame member, said upper frame member being pivotally connected at a forward end to said lower frame member; a caster wheel mounting; a drive wheel mounting; and a foot rest mounting; connecting means connecting said pair of side frame assemblies; and a suspension support member connecting said upper frame member and said lower frame member so that said upper frame member is supported by said suspension support member and pivots at the forward end about the pivotal connection.

In accordance with another aspect of the present invention, a wheelchair is provided comprising a pair of side frame assemblies, each of said side frame assemblies comprising an upper frame member and a lower frame member which are connected by a flexible connection at a forward end of said upper frame member; a caster wheel mounting having a caster wheel; a drive wheel mounting having a drive wheel; a footrest mounting having a footrest; a connector connecting said pair of side frame assemblies; a seat between said pair of side frame assemblies; and a suspension member connecting said upper frame member and said lower frame member so that said upper frame member is supported by said suspension member and moves at the forward end about the flexible connection.

In another aspect, the above novel designs are incorporated into a foldaable wheelchair comprising a pair of side frame assemblies, each of said side frame assemblies comprising an upper frame member pivotally connected at a forward end to a lower frame member; a caster wheel mounting connected to the lower frame member; a drive wheel mounting connected to the lower frame member; and a foot rest mounting connected to the side frame assembly at a forward end; folding connector means for connecting said pair of side frame assemblies; and a suspension member connecting said upper frame member and said lower frame member so that said upper frame member is supported by said suspension member and pivots at the forward end about the pivotal connection.

BRIEF DESCRIPTION OF THE DRAWINGS

Many objects and advantages of the present invention will be apparent to those of ordinary skill in the art when this specification is read in conjunction with the attached drawings. The invention will now be described with reference to the accompanying drawings wherein like reference numerals are applied to like elements and wherein.

DETAILED DESCRIPTION OF THE INVENTION

Figure 1:
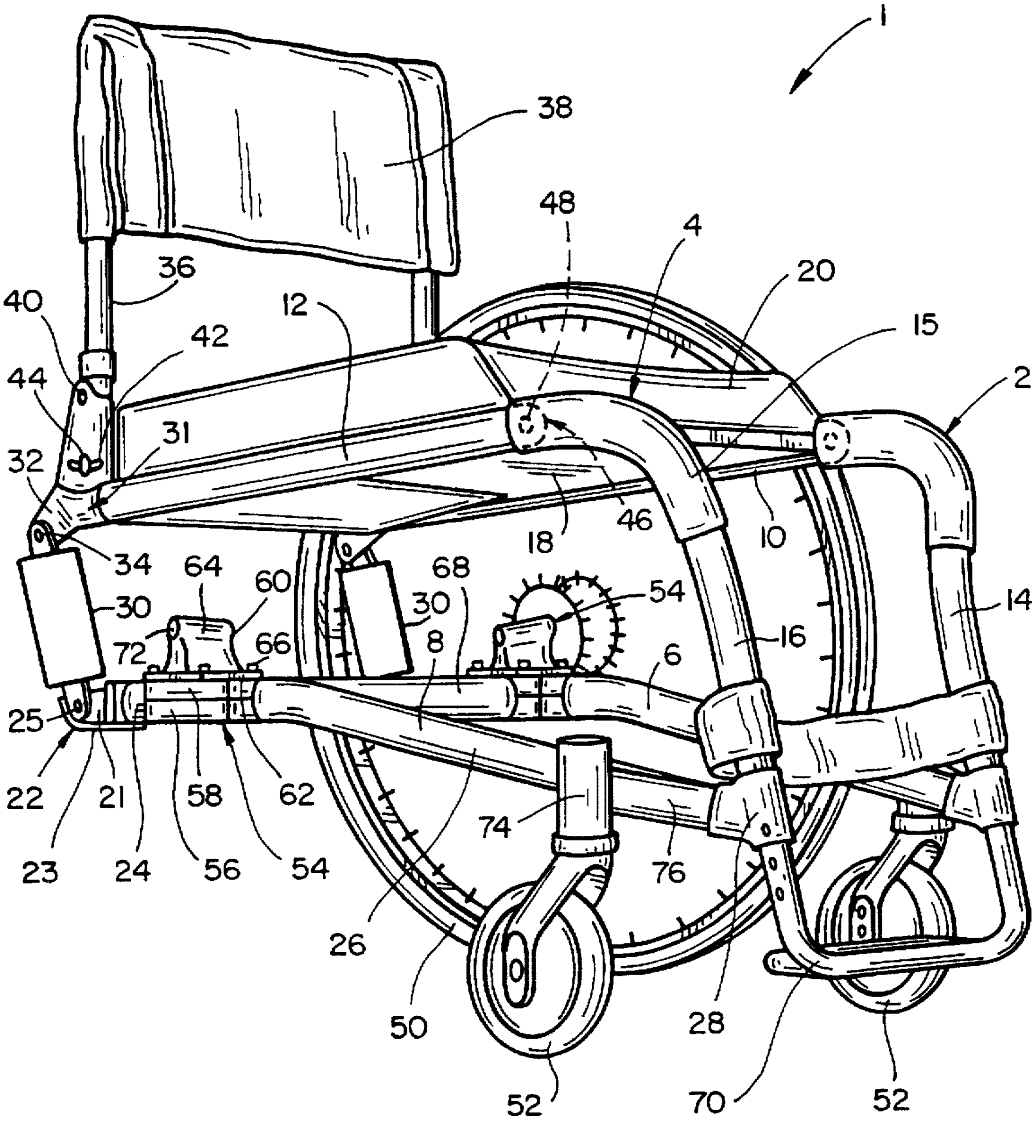
FIG. 1 is a perspective view of one embodiment of a wheelchair frame and mounting assembly for the suspension system in accordance with the present invention.

In one embodiment of the present invention (FIG. 1), there is provided a wheelchair and wheelchair frame 1 having a pair of side frame assemblies 2, 4. Each side frame assembly 2, 4 includes a lower frame member 6, 8, an upper frame member 10, 12 and a footrest member 14, 16. It is contemplated that footrest member 14, 16 can be omitted and the lower frame member 6, 8 extends up to meet upper frame member 10, 12 or upper frame member 10, 12 can extend down to meet lower frame member 6, 8. A seat pan 18 extends between the upper frame members 10, 12.

The seat pan 18 can be mounted in a groove formed in each of the upper frame members 10, 12. In addition, the seat pan 18 can be of a rigid construction in order to perform a structurally supportive function. That is, the seat pan 18 can be fabricated as a sandwich laminate that includes a pair of outside or skin layers separated by a sandwich core. A cushion 20 can be positioned on the seat pan 18. A padded cover 15 can also be provided to protect the user's legs and to aid in transferring in and out of the wheelchair.

The two side frame assemblies 2, 4 are substantially identical in construction, or are mirror image construction to the extent needed for assembly of mated pairs. Thus, the following description of features pertaining to one of the side frame assemblies 4 is equally applicable to the other side frame assembly 2.

The lower frame member 8 includes a rear mounting bracket 22. The rear mounting bracket 22 has a suspension member support portion 21 and a base portion 23. The suspension member support portion 21 is provided with at least one through hole. Suitable securing means 25, such as a pin or a nut and bolt, can be provided to secure the suspension support member 30 to the suspension member support portion 21 in a fixed or pivotal fashion. Preferably, the securing means 25 is removable to allow changing suspension support member 30.

In one embodiment, the lower frame member 8 also includes a straight portion or rear region 24 extending from the rear mounting bracket 22 and a portion 26 extending downward and forward that is connected to the footrest member 16 by way of a lug 28. The lug 28 is attached by an adhesive bond or by mechanical means to both the downward forward portion 26 of the lower frame member 8 and to the footrest member 16.

The upper frame member 12 extends from an opposite end of the footrest member 16 to the upper mounting bracket 31. The upper frame member 12 is structurally connected to the suspension support member 30 by way of upper mounting bracket 31. One portion 32 of the upper mounting bracket 31 is provided with at least one through hole. Suitable securing means 34, such as a pin or a nut and bolt, can be provided to secure the suspension support member 30 to the upper mounting bracket 31 in a fixed or pivotal fashion. Preferably, the securing means 34 is removable to allow changing suspension support member 30.

Figure 2:
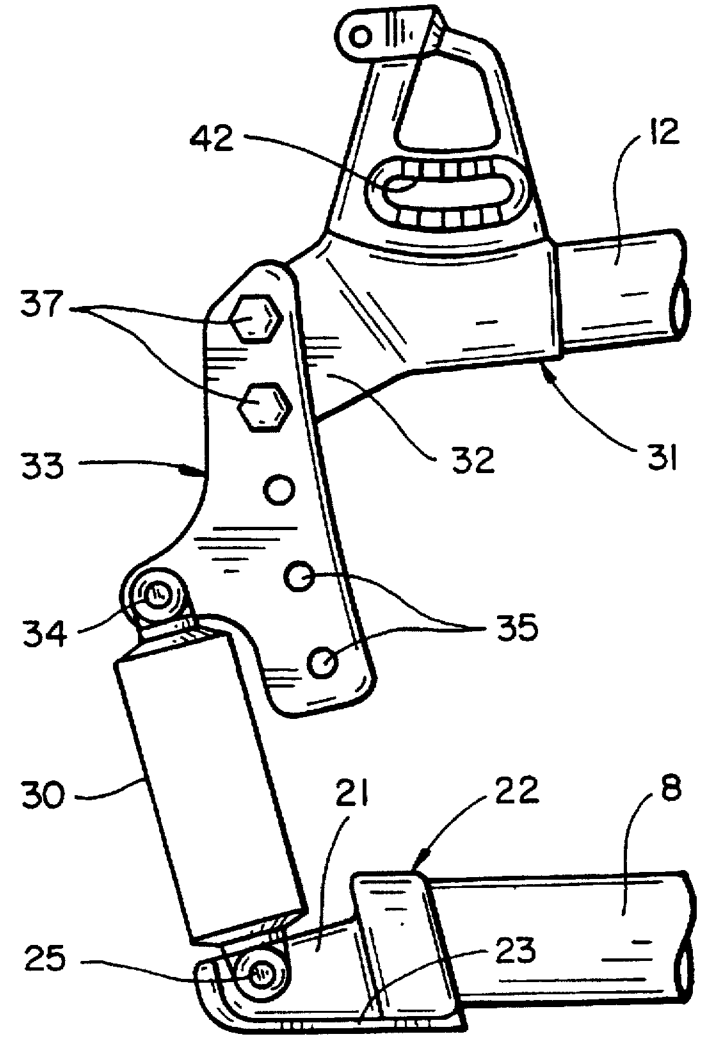
FIG. 2 is an enlarged fight side view of another embodiment of the mounting assembly for the suspension system in accordance with the present invention.

In another embodiment, as seen in FIG. 2, an adjustable mounting bracket 33 having a plurality of mounting holes 35 can be attached between the upper mounting bracket 31 and suspension support member 30. Securing means 34, such as a pin or a nut and bolt, can be used to secure the suspension support member 30 to the adjustable mounting bracket 33 in a fixed or pivotal fashion. Preferably, the securing means 34 is removable to allow changing suspension support member 30. Securing means 37, such as a pin or a nut and bolt, can be used to removably secure the adjustable mounting bracket 33 to the upper mounting bracket 31. The mounting holes 35 are disposed along an arc having a radius that originates at the pivotal or flexible connection 46 (FIG. 5) about which the upper frame member 12 rotates. As a result, the securing means 37 can be mounted in any of the mounting holes 35 in order to adjust the upper frame member 12 (and seat) to a desired angle relative to a horizontal plane without affecting the center of gravity of the wheelchair, the caster alignment, or the position of the drive wheels. In addition, adjustment of the upper frame member 12 (and seat) to a desired angle will not create tow-in or tow-out, change the camber of the drive wheels, or change the proper alignment of suspension support member 30.

The rear mounting bracket 22 and upper mounting bracket 31 are preferably fabricated of cast magnesium or aluminum. However, other materials such as fiber reinforced plastic composite material could be employed.

As can be seen from FIG. 1, the upper mounting bracket 31 is also pivotally connected to a seat back frame member 36 which serves as a mounting structure for a seat back cushion 38. The upper mounting bracket 31 is pivotally connected to the seat back frame member 36 by way of a pivot connection 40. The upper mounting bracket 31 is also provided with an elongated arcuate slot 42 through which extends a pin 44 that is connected to the seat back frame member 36. As a result, the seat back frame member 36 can pivot about the pivot connection 40 relative to the seat cushion 20. In that way, the seat back cushion 38 can be inclined or not inclined to the extent desired by the user. The ends of the generally arcuate slot 42 and the upper mounting bracket 31 define the extent of the pivotal movement allowed by the seat back frame member 36. The pin 44 or other appropriate securing arrangement allows the seat back frame member 36 to be secured at the desired position.

The suspension support member 30 (represented diagrammatically) mounted between the rear mounting bracket 22 and the upper mounting bracket 31 acts to dampen and/or absorb the vibrations and shock forces the wheelchair experiences from the drive wheels encountering irregularities and obstacles on the road surface. The suspension support member 30 can be any of a variety of elements known to one of ordinary skill in the art, such as elastomers, springs, gas shock absorbers, oil shock absorbers, elastomeric shock absorbers, a leaf spring, a torsion bar, an air bladder, etc. The suspension support member 30 also acts as a support member for the user. One of ordinary skill in the art can select the proper suspension support member 30 based on its load bearing and energy absorption characteristics. It is desirable to select a suspension support member that is restricted to movement in an axial direction only and that prevents lateral movement of the upper frame members. In other words, the shock should be stiff enough to maintain rigidity of the wheelchair while also providing the desired damping. It is desirable that when the suspension support member deflects that it remains flexible and does not bind or stick in the axial direction which could result in losses in overall shock efficiency.

Upon impact with an obstacle, the suspension support member should absorb a large percentage of the impact energy and efficiently transmit it to another form, such as deformations if an elastomer is used. In one embodiment, a "multiple stage" suspension support member can be used to absorb a wide range and variety of impacts. For example, various elastomer materials can be used in combination together, or in combination with other materials such as springs to absorb large impacts (e.g., dropping off curbs) and small impacts (e.g., uneven paved roads, door jams). In other words, each "stage" of elastomer will efficiently damp out certain special impacts. In addition, the suspension support member may have a preload adjustment mechanism so that the user can select a firm ride or a soft ride, or "tune" each stage to their preference. It is desirable that each or some of the individual stages in the suspension support member be interchangeable by the user so that the user can modify the suspension support member characteristics to his/her particular needs.

Figure 10:
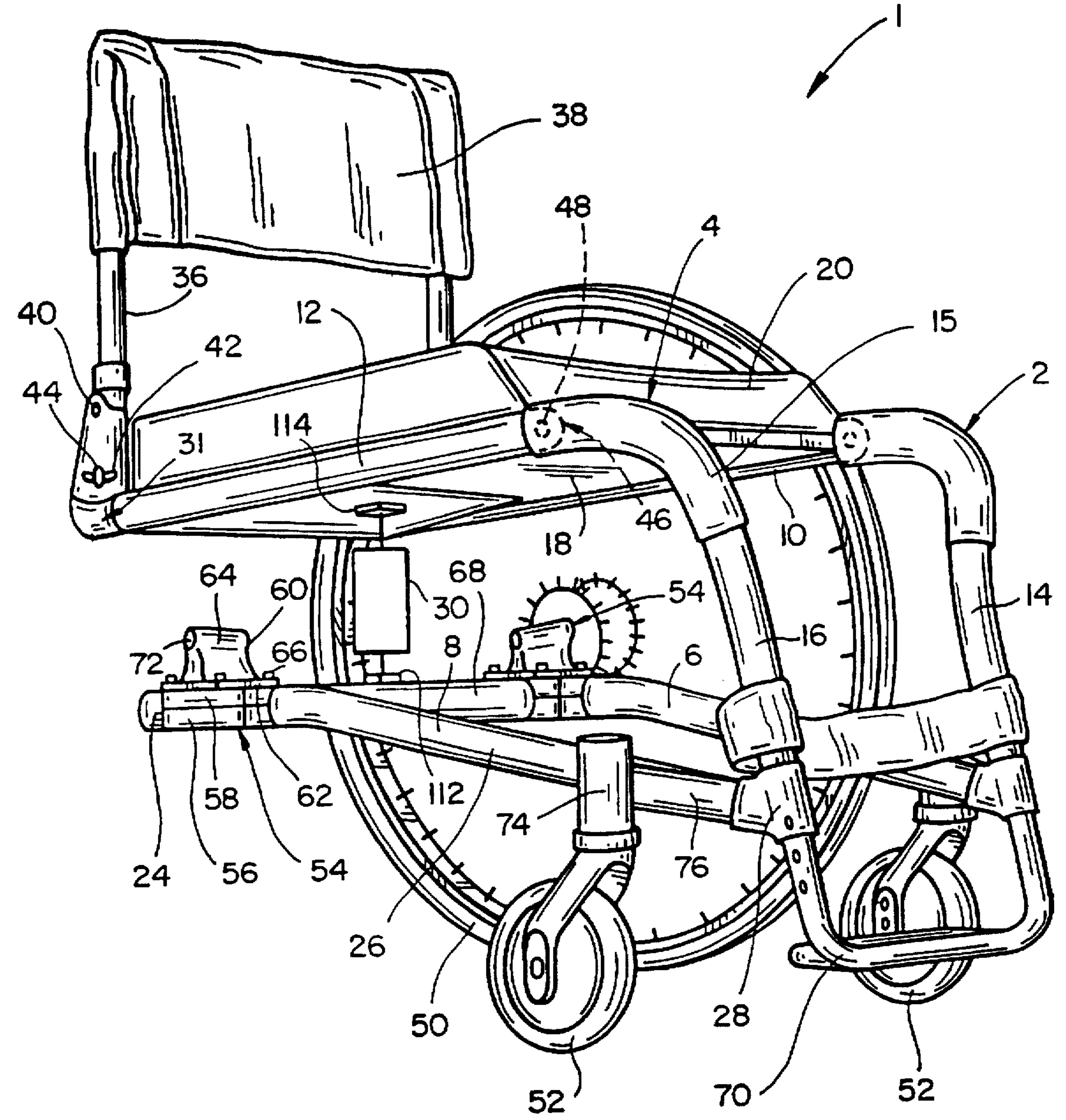
FIG. 10 is a perspective view of one embodiment of a wheelchair frame with one suspension member in accordance with the present invention.

In another embodiment, only a single suspension support member 30 (represented diagrammatically) is used (FIG. 10) Preferably, the single suspension support member is centered between the two side frame assemblies and connected between a lower mounting bracket 112 attached to a connector member located between the two lower frame members and an upper mounting bracket 114 attached to the bottom of the seat pan. In addition, the suspension support members in either the dual suspension support member wheelchair or the single suspension support member wheelchair can be replaced with a rigid member or locked in a given position to provide conventional rigidity to the wheelchair for a period of time if the user desires, such as for sports use where stiffness is important.

Figure 6:
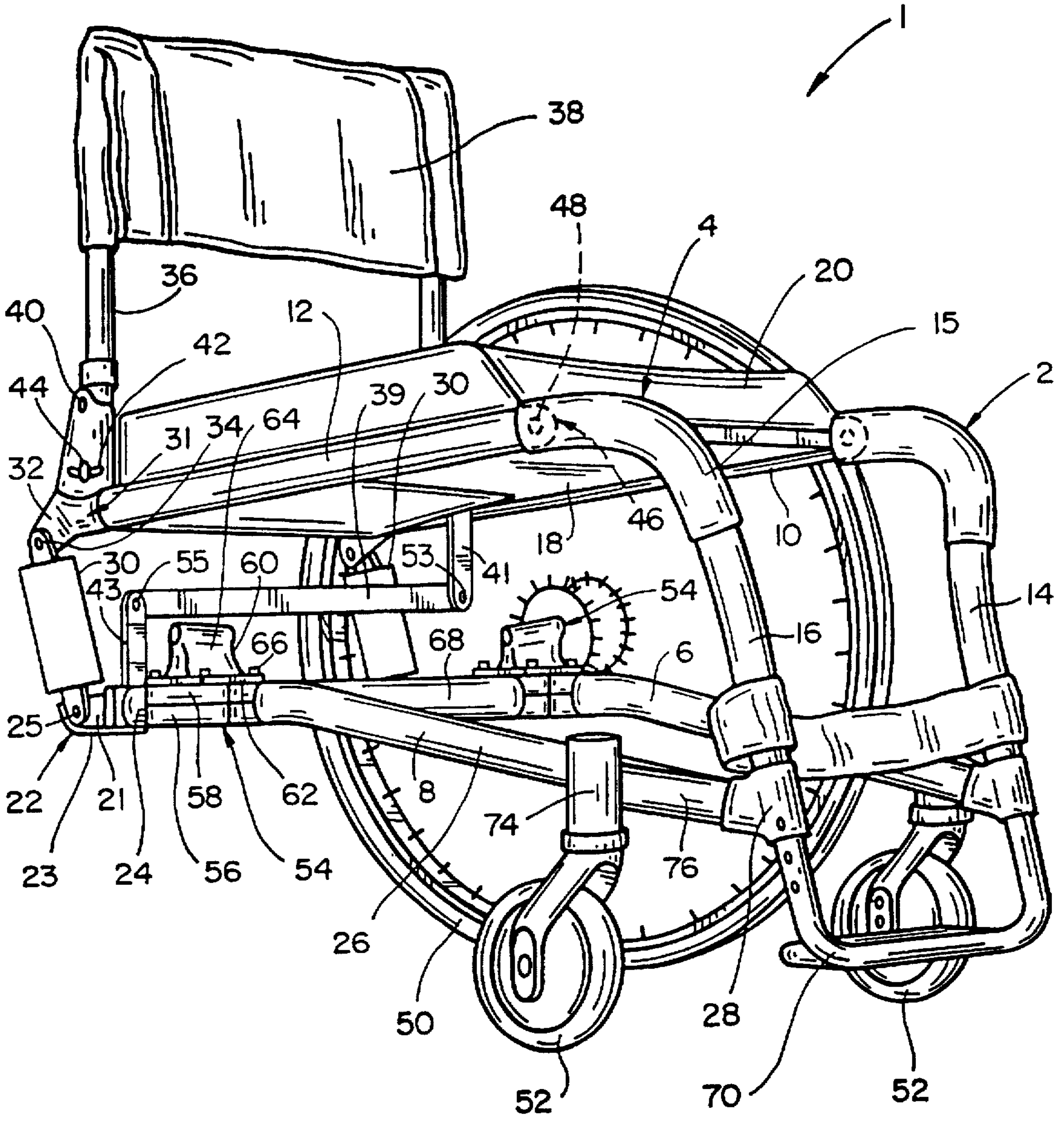
FIG. 6 is a perspective view of one embodiment of a wheelchair frame with a stabilizer bar in accordance with the present invention.

In still another embodiment, a horizontal stabilizer 39 (FIG. 6) can be incorporated to prevent lateral movement of the upper frame with respect to the lower frame. The horizontal stabilizer 39 is attached to upper frame member 10 by vertical support 41 and to lower frame member 8 by vertical support 43. The movable connections, such as pin connections 53,55, allow horizontal stabilizer 39 to move vertically as the upper frame members 10, 12 move up and down while maintaining lateral stability of the upper frame relative to the lower frame.

Figure 3:
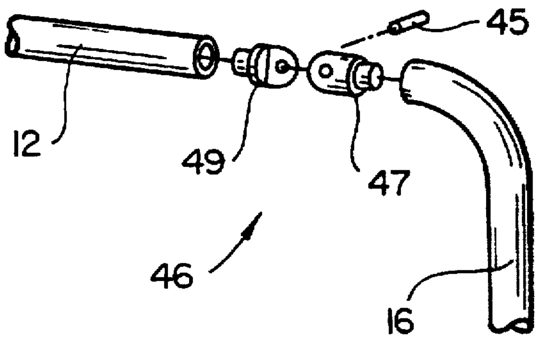
FIG. 3 is an exploded view of one embodiment of a pivotal connection in accordance with the present invention.
Figure 4:
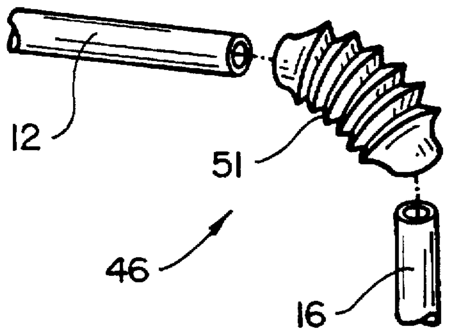
FIG. 4 is an exploded view of a flexible connection in another embodiment of the present invention.

In another embodiment, the upper frame member 12 can be connected to the footrest member 16 by a pivot joint and lug assembly that includes pivot lug fork 47, pivot lug plug 49 and pivot pin 45 (FIG. 3). Each of the lugs 47, 49 can be adhesively bonded to the foot rest member 16 and the upper frame member 12, respectively. In another embodiment, the upper frame member 12 can be connected to the footrest member 16 by a flexible coupling element 51 (FIG. 4). The flexible coupling element can be any of a variety of elements that bend such as a reinforced coil spring with a protective accordion housing, a tightly coiled spring, an elastomer, a leaf spring, etc. The coupling element need only be sufficiently strong enough to support part of the weight of the user and be flexible enough to allow the upper frame members to move rotationally or substantially upward and downward. In addition, the pivot joint can be a ball and socket connection.

Figure 5:
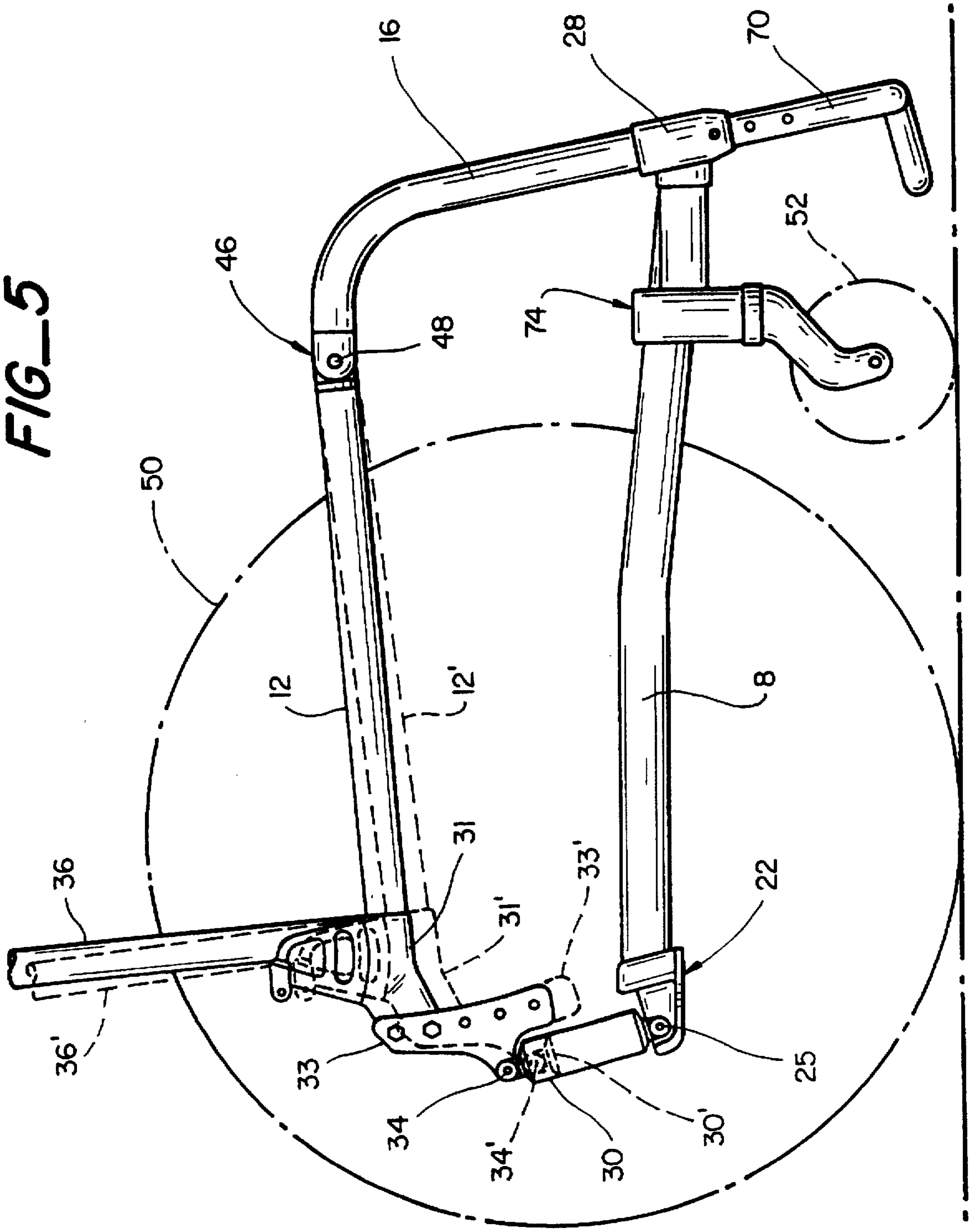
FIG. 5 is a right side view of the suspension system in its normal position and its compressed position.

As will be recognized, the pivot connection or flexible connection 46 can be located at any desired position along the upper frame or lower frame. It is desirable, if the pivot connection or flexible connection is along the upper frame, that the connection be forward of the seat pan 18. If the pivot connection or flexible connection is along the lower frame, then it is preferable that the connection be forward of the caster mounting assembly 74 to maintain proper wheel alignment when the support member 30 compresses. It is usually preferred that the pivot connection be above the lug 28 so that when the suspension support members 30 compress, the footrest and the user's feet are not translated forward, i.e., the wheelchair does not increase in overall length. In one embodiment, upper frame member 12 and foot rest member 16 can be merged into a single member, and pivot point 48 can be positioned at lug 28. A preferred embodiment is shown in FIGS. 1 and 5, wherein pivot point 48 is positioned between the upper frame member 12 and the foot rest member 16 just forward of the forward edge of seat pan 18.

Due to the pivot connection or flexible connection 46 between the foot rest member 16 and the upper frame member 12, the upper frame member 12 (and therefore seat pan 18) can pivot so as to absorb the shock caused by obstacles and irregularities encountered by the drive wheels. FIG. 5 shows the location of each element of the wheelchair when the suspension support member 30 is compressed to suspension support member position 30'. The upper frame member 12 rotates about the flexible connection 46 to upper frame member position 12'. As can be seen, lower frame member 8 and caster mounting assembly 74 maintain their positions and therefore remain in proper alignment. In other words, the drive wheels and caster wheels remain true.

As a result, the angle of the seat pan relative to a horizontal plane can fluctuate in response to forces transmitted through the suspension support member from the drive wheels without affecting the center of gravity of the wheelchair. Further, the seat pan angle can fluctuate without affecting, changing or altering the trueness, camber, or alignment of the drive wheels 50 or the alignment of caster wheels 52 or the caster mounting assembly 74.

The movement of the upper mounting bracket 31 along an arc whose radius originates from the pivot or flexible connection 46 is quite advantageous as it helps to ensure that fluctuation of the seat pan angle will not alter any other characteristic of the wheelchair or suspension support member. In essence, the entire wheelchair, except for the upper frame members 10, 12 and the seat members, is fixed in space while the upper frame members 10, 12 are free to rotate about the connection 46 at the forward region of the frame. Thus, upper frame members 10, 12 along with the seat pan 18 rotate or move upward and downward in such a way so that no other aspect or characteristic of the wheelchair such as the position of the drive wheels 50, the vertical orientation (camber) of the drive wheels, the position of the casters 52, or the vertical orientation (caster) of the longitudinal axis of the caster stem is changed. By keeping the orientation and alignment of the drive wheels and caster wheels true, the wheelchair is more stable, is more maneuverable and has less rolling friction or resistance.

In one embodiment, mounted at the rear region 24 of the lower frame member 8 is a drive wheel mounting assembly 54 (FIG. 1). The drive wheel mounting assembly 54 can include a lower mounting block 56, an upper mounting block 58 and a drive wheel axle receiving element 60. The drive wheel axle receiving element 60 can include a mounting plate portion 62 and an axle receiving portion 64. Further, the mounting plate portion 62 and the axle receiving portion 64 can be integral with one another and formed in one piece.

The drive wheel axle receiving element 60 can be connected to the upper mounting block 58 by any suitable connecting means 66, such as bolts and nuts. The connecting means 66 is preferably selected to allow the upper mounting block 58 and the drive wheel axle receiving element 60 to be disconnected from one another. The lower mounting block 56 can be connected to the upper mounting block 58 by any suitable connecting means similar to connecting means 66. Preferably, the connecting means will allow the lower mounting block 56 and upper mounting block 58 to be disconnected from one another. Additionally, connecting means 66 may connect the drive wheel axle receiving element 60, the upper mounting block 58, and the lower mounting block 56 all together. The drive wheel axle receiving dement 60 can help to define the camber and tow-in of the drive wheels 50.

In another embodiment, the rear region 24 of the lower frame member 8 can be provided with a plurality of spaced apart indexing keys or teeth that are preferably integral with and formed unitarily with the lower frame member. The indexing keys on the lower frame member 8 associated with the one side frame assembly 4 are preferably aligned with the indexing keys on the lower frame member 6 associated with the other side frame assembly 2. In that way, the drive wheel mounting assembly 54 positioned on each lower frame member 6, 8 can be positioned at the same place along the respective lower frame member 6, 8 to ensure that each of the drive wheels is at the same position.

As seen in FIG. 1, a drive wheel mounting assembly 54 is secured to each of the bottom members 6, 8. Extending between each drive wheel mounting assembly 54 is a connecting means or connector such as rigid supporting member 68 which serves to connect the side frame assemblies 2, 4 to one another and impart rigidity to the wheelchair frame. In one embodiment, the rigid supporting member 68 and the seat pan 18 that extends between the upper frame members 10, 12 provide substantially all of the structural support and interconnection between the two side frame assemblies 2,4. The one piece footrest 70 that is connected to the footrest members 14, 16 also contributes to the rigid interconnection of the two side frame assemblies 2, 4.

Figure 7:
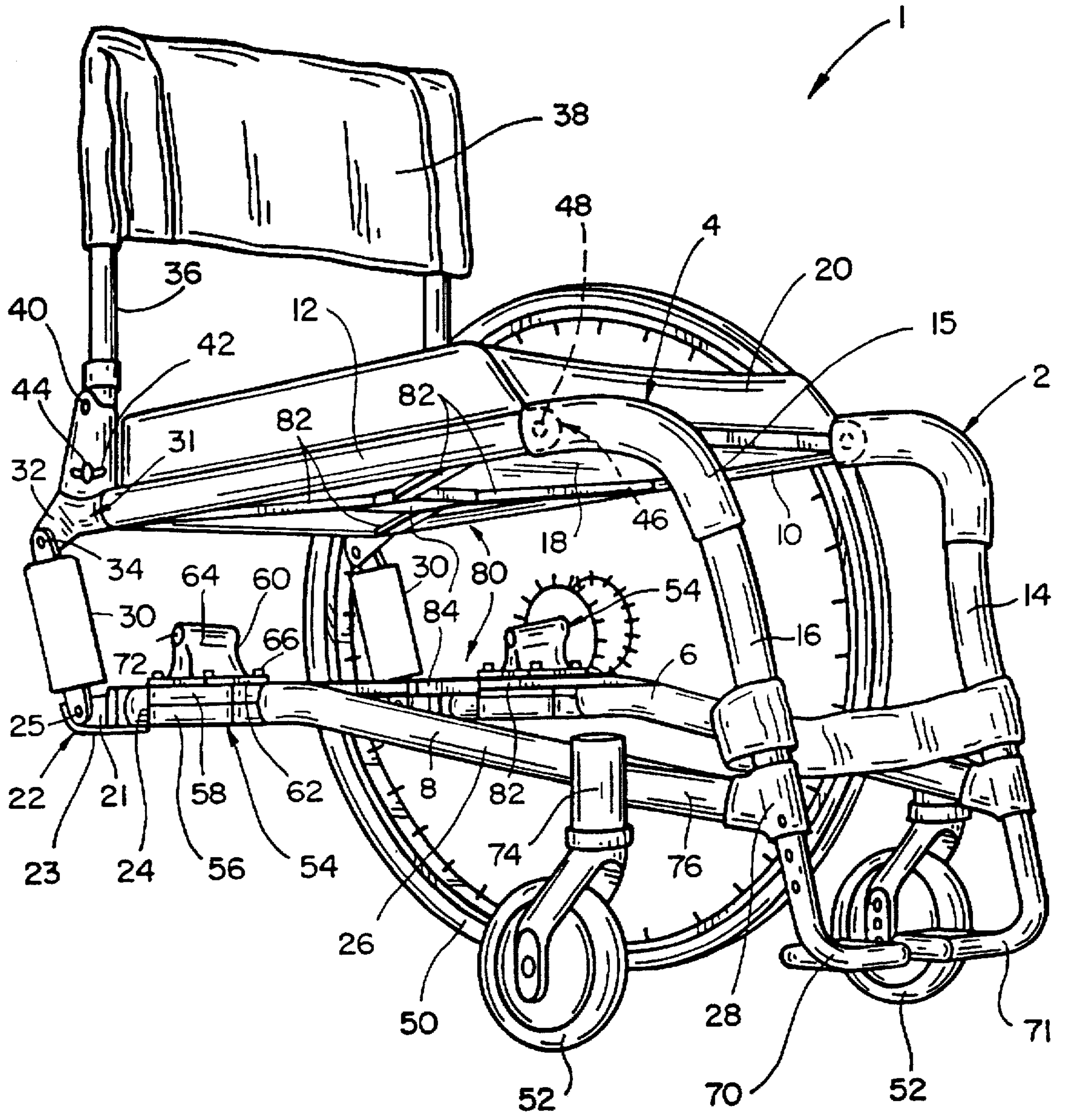
FIG. 7 is a perspective view of a folding wheelchair frame in accordance with the present invention.

In another embodiment, a folding wheelchair is equipped with the suspension support system of the present invention (FIG. 7). A scissor-type folding mechanism 80 is mounted parallel to or in the same plane as the seat pan 18 between upper frame members 10,12. Another scissor-type folding mechanism 80 is mounted parallel to or in the same plane as the lower frame members 6,8. Preferably, the two folding mechanisms are identical therefore only one will be described. The folding mechanism 80 (FIG. 8) has four support arms 82 that form an X-shape when the folding mechanism is fully extended. The support arms are pivotally attached to the locking mechanism 84 and the lower frame members 6,8. When the folding mechanism is fully extended a locking mechanism 84 secures the support arms 82 in place so that they do not retract or fold until the user releases the locking mechanism. When the wheelchair is folded, the side frame assemblies 2,4 are moved together and the support arms 82 pivot about their pivotal connections until they are substantially parallel with the upper frame members 10, 12 and lower frame members 6,8.

The folding wheelchair 1 has two separate footrests 70,71 attached to footrest members 16,14, respectively. Footrest 70,71 are usually pivotally attached to enable them to be folded out of the way when the chair is folded. In addition, seat pan 18, seat cushion 20, and seat back cushion 38 are flexible to facilitate folding of the wheelchair. In this way, the two scissor-type folding mechanisms 80 and support arms 82 provide substantially all of the structural support and interconnection between the two side frame assemblies 2,4. Additionally, a folding mechanism 86 comprising support arms 88 and locking mechanism 90 can be mounted parallel to or in the same plane as the forward end of the lower frame members 6,8 to provide added rigidity to the wheelchair. Alternatively, seat pan 18 can be a rigid structural member that is either detachable at both sides or hinged to frame 12 at one side and detachable at the other side. In such case the seat pan can also provide part of the structural support and interconnection between the two side frame assemblies.

Figure 8:
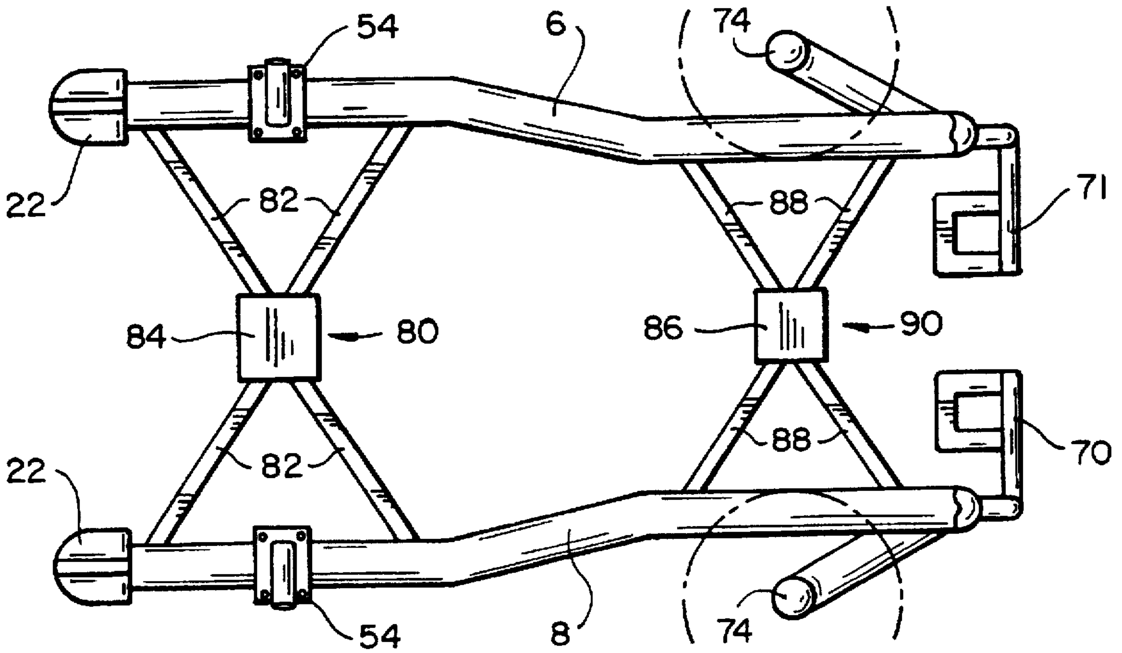
FIG. 8 is a top plan view of a folding mechanism in one embodiment of the present invention.
Figure 9:
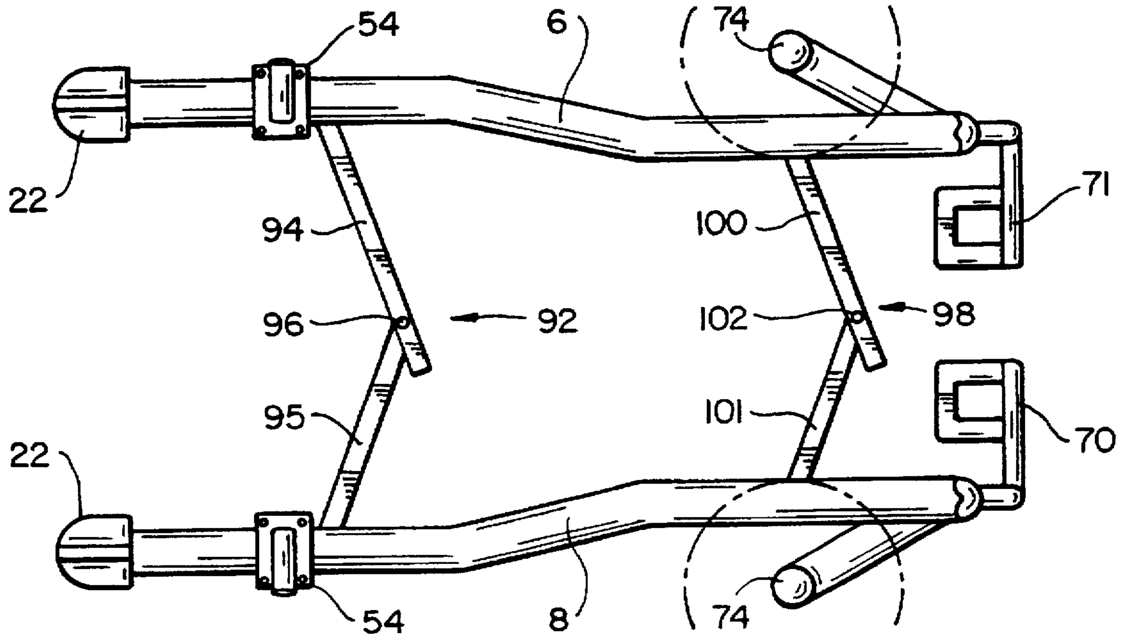
FIG. 9 is a top plan view of a folding mechanism in accordance with another embodiment of the present invention.

The folding mechanism in FIGS. 7 and 8 is only illustrative, many other folding mechanisms known to those of ordinary skill in the art can be used. For example, FIG. 9 shows folding mechanisms 92,98 in an unlocked position. Both folding mechanisms 92,98 are constructed the same except for dimensional differences of the support arms, therefore only one folding mechanism will be described. In addition a similar folding mechanism can be mounted between upper frame members 10, 12. Folding mechanism 92 is comprised of support arms 94,95 which are pivotally connected to lower frame members 6,8 and to each other by pivot connection 96. When the folding mechanism 92 is in a locked position, the support arms 94,95 are axially aligned and provide lateral rigidity to the wheelchair. In a folded position, the side frame assemblies 2,4 are moved together and the support arms 94,95 and 100, 101 pivot about their pivotal connections until they are substantially parallel with the side frame assemblies 2,4. As will be appreciated by one of ordinary skill in the art different locking mechanisms can be used in combination with the folding mechanisms 92,98 to hold them in their locked position for a time as the user desires. One commonly known device is simply a sleeve that slides over the overlapping portions of the support arms 94,95. It will also be appreciated by one of ordinary skill that the folding mechanisms 92,98 can be connected by a rigid member between the two pivotal connections 96 and 102 so that the two folding mechanisms can be operated at the same time.

In a manner similar to that described above, a plurality of drive wheel axle receiving elements 60 can be provided, each of which has an axle receiving hole 72 inclined at a different angle and/or a mounting plate portion 62 having a different thickness. In that way, the drive wheels can be provided with more or less camber.

The forward section of the lower frame member 8 and the upper frame member 12 can be formed from any of a variety of materials such as aluminum tubing or fiber reinforced plastic composite material. Likewise, the rear section of the lower frame member 8 can be fabricated from any of a variety of materials such as magnesium, aluminum, or fiber reinforced plastic composite material. The front and rear sections can be fabricated of the same material or different materials.

The wheelchair and wheelchair frame 1 illustrated in FIG. 1 may also include the caster mounting assembly 74 which allows a caster wheel 52 to be secured to both of the lower frame members 6,8. In one embodiment, a support arm 76 is attached between the lug 28 and caster mounting assembly 74 in order to locate the caster wheels out from the lower frame members for greater stability of the wheelchair. In addition, the casters are able to be flipped forward or backward for stability. The caster mounting assembly 74 can be attached to the support arm 76 by way of suitable connecting means such as nuts and bolts (not shown) or by being integrally formed with the mounting assembly 74.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed without departing from the spirit of the present invention, and it is expressly intended that all such variations, changes and equivalents which fall within the spirit and scope of the present invention as defined in the claims be embraced thereby.

What is claimed is:

1. A wheelchair frame, comprising:

a pair of side frame assemblies, each having a lower frame member having forward and rear ends, an upper frame member having forward and rear ends, a pivotal connection coupling the forward end of the upper frame member to the lower frame member, a caster wheel connected to the lower frame member, and a drive wheel connected to the lower frame member;

a footrest mounted to the side frame assemblies at the forward end of each lower frame member below the pivotal connection;

connecting means for connecting the pair of side frame assemblies together;

suspension means connecting the upper frame members and the lower frame members so that the upper frame members rearward of the pivotal connections are supported by the suspension means and the upper frame members pivot about the pivotal connections without rotation of the footrest relative to the lower frame members, the suspension means comprising at least one suspension member having first and second ends, the first end being mounted in relation to the lower frame members for applying downward load to the lower frame members, and an adjustment bracket mounted between the second end of said at least one suspension member and the upper frame members for applying downward force from the upper frame members to said at least one suspension member, the adjustment bracket being adapted to enable the height of the upper frame members rearward of the pivotal connections to be upwardly and downwardly adjusted relative to the lower frame members while transferring vertical loads between the upper and lower frame members to said at least one suspension member.

2. The wheelchair frame of claim 1 wherein the suspension means is connected between the upper frame members and the lower frame member at a rearward end of each of the side frame assemblies.

3. The wheelchair frame of claim 1 wherein said at least one suspension member is a shock absorber.

4. The wheelchair frame of claim 1 wherein at least one suspension member comprises a shock absorber mounted on the connecting means and centered between the pair of side frame assemblies.

5. The wheelchair frame of claim 1 wherein the suspension member comprises a shock absorber mounted between each of the upper frame members and the lower frame members.

6. The wheelchair frame of claim 1 wherein the pivotal connection comprises a pin connection.

7. The wheelchair frame of claim 1 wherein the adjustment bracket comprises a plurality of adjustment positions.

8. The wheelchair frame of claim 7 wherein the plurality of positions are arranged in an arc having a radius and a center, the center of the arc being at the pivotal connection coupling the upper and lower frame members.

9. The wheelchair frame of claim 1 wherein the pivotal connection comprises a flexible coupling.

10. A wheelchair, comprising:

a pair of side frame assemblies, each of the side frame assemblies comprising upper and lower frame members, a flexible connection coupling the forward end of the upper frame member to the lower frame members, a caster wheel mounting connected to the lower frame member, a drive wheel mounting connected to the lower frame member, and a footrest mounting connected to the side frame assembly at a forward end of the lower frame member below the flexible connection;

a connector connecting the pair of side frame assemblies together;

a seat between the pair of side frame assemblies; and suspension means connecting the upper frame member and the lower frame member so that the upper frame member rearward of the flexible connection, is supported by the suspension means and the upper frame member moves at the forward end about the flexible connection without rotation of the footrest mounting relative to the lower frame members, the suspension means comprising at least one suspension member having first and second ends, the first end being mounted in relation to the lower frame members for applying downward load to the lower frame members, and an adjustment bracket mounted between the second end of said at least one suspension member and the upper frame members for applying downward force from the upper frame members to said at least one suspension member, the adjustment bracket being adapted to enable the height of the upper frame members rearward of the flexible connections to be upwardly and downwardly adjusted while transferring vertical loads between the upper and lower frame members to said at least one suspension member.

11. The wheelchair of claim 10 wherein the suspension means is connected between the upper frame members and the lower frame member at a rearward end of each of the side frame assemblies.

12. The wheelchair of claim 10 wherein said at least one suspension member is a shock absorber.

13. The wheelchair of claim 10 wherein the suspension means comprises a shock absorber mounted between each of the upper frame members and the lower frame members.

14. The wheelchair of claim 10 wherein the adjustment bracket comprises a plurality of adjustment positions.

15. The wheelchair of claim 14 wherein the plurality of adjustment positions are arranged in an arc having a radius and a center, the center of the arc being at the flexible connection.

16. A folding wheelchair frame, comprising:

a pair of side frame assemblies, each of the side frame assemblies comprising a lower frame member, a pivotal connection coupling the forward end of the upper frame member to the lower frame member, a caster wheel mounting connected to the lower frame member, a drive wheel mounting connected to the lower frame member, and a footrest mounting connected to a forward end of the lower frame member below the pivotal connection;

folding connector means for connecting the pair of side frame assemblies; and suspension means connecting the upper frame member and the lower frame member so that the upper frame member rearward of the pivotal connection is supported by suspension means and the upper frame member pivots at the forward end about the pivotal connection without translation of the footrest mounting relative to the lower frame members, the suspension means comprising at least one suspension member having first and second ends, the first end being mounted in relation to the lower frame members for applying downward load to the lower frame members, and an adjustment bracket mounted between the second end of said at least one suspension member and the upper frame members for applying downward force from the upper frame members to said at least one suspension member, the adjustment bracket being adapted to enable the height of the upper frame members rearward of the pivotal connections to be upwardly and downwardly adjusted while transferring vertical loads between the upper and lower frame members to said at least one suspension member.

17. The folding wheelchair frame of claim 16 wherein the suspension means is connected between the upper frame members and the lower frame member at a rearward end of each of the side frame assemblies.

18. The folding wheelchair frame of claim 17 wherein said at least one suspension member, is a shock absorber.

19. The folding wheelchair frame of claim 16 wherein the adjustment bracket comprises a plurality of adjustment positions.

20. The folding wheelchair frame of claim 19 wherein the plurality of positions are arranged in an arc having a radius and a center, the center of the arc being, at the pivotal connection coupling the upper and lower frame members.

* * * * *